United States Patent [19]
Pan

[11] 3,903,813
[45] Sept. 9, 1975

[54] METHOD AND APPARATUS FOR INCINERATING SLUDGE

[75] Inventor: Pei-Tai Pan, Pawtucket, R.I.

[73] Assignee: Colt Industries Operating Corporation, New York, N.Y.

[22] Filed: May 28, 1974

[21] Appl. No.: 473,747

[52] U.S. Cl. ................................. 110/7 B; 110/8 C
[51] Int. Cl.² ............................................ F23G 5/12
[58] Field of Search ............ 110/7 R, 7 B, 7 S, 8 R, 110/8 C

[56] References Cited
UNITED STATES PATENTS

| | | | |
|---|---|---|---|
| 2,319,591 | 5/1943 | Ferguson | 110/7 X |
| 3,489,108 | 1/1970 | Garrer et al. | 110/7 |
| 3,659,786 | 5/1972 | Wier et al. | 110/7 |
| 3,738,289 | 6/1973 | Hanway, Jr. | 110/7 |
| 3,805,714 | 4/1974 | Sharpe | 110/7 X |
| 3,822,653 | 7/1974 | Ghelfi | 110/7 |

*Primary Examiner*—Kenneth W. Sprague
*Attorney, Agent, or Firm*—Robert E. Browne; Leo J. Aubel

[57] ABSTRACT

An incineration apparatus for combusting sludge having a combustion chamber with an exit port, means for injecting the sludge into the chamber under pressure to produce a spray, such means including a pressurized fluid line in communication with a conduit for introducing and mixing a fluid under pressure with the sludge and a restrictive orifice disposed at the inward end of the conduit through which the sludge may be forced under pressure and thereby expanded into a spray within the chamber, a burner having a flame extending inwardly into the chamber and disposed slightly above and directed at a divergent angle from the means injecting the sludge into the chamber such that the flame is drawn inwardly into the area of the waste spray to combust the waste in a turbulent manner and prevent quenching of the burner flame. A method of incinerating sludge by injecting such sludge into a combustion chamber under pressure to produce a sludge spray and heating such sludge spray rapidly to a temperature sufficient to cause combustion of the sludge by a burner flame disposed slightly above and at a diverging angle to the point at which the sludge is injected into the chamber.

7 Claims, 2 Drawing Figures

PATENTED SEP 9 1975 3,903,813
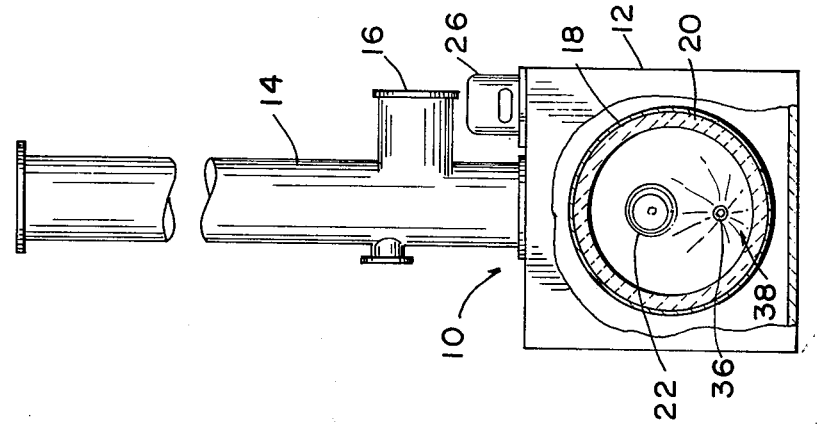
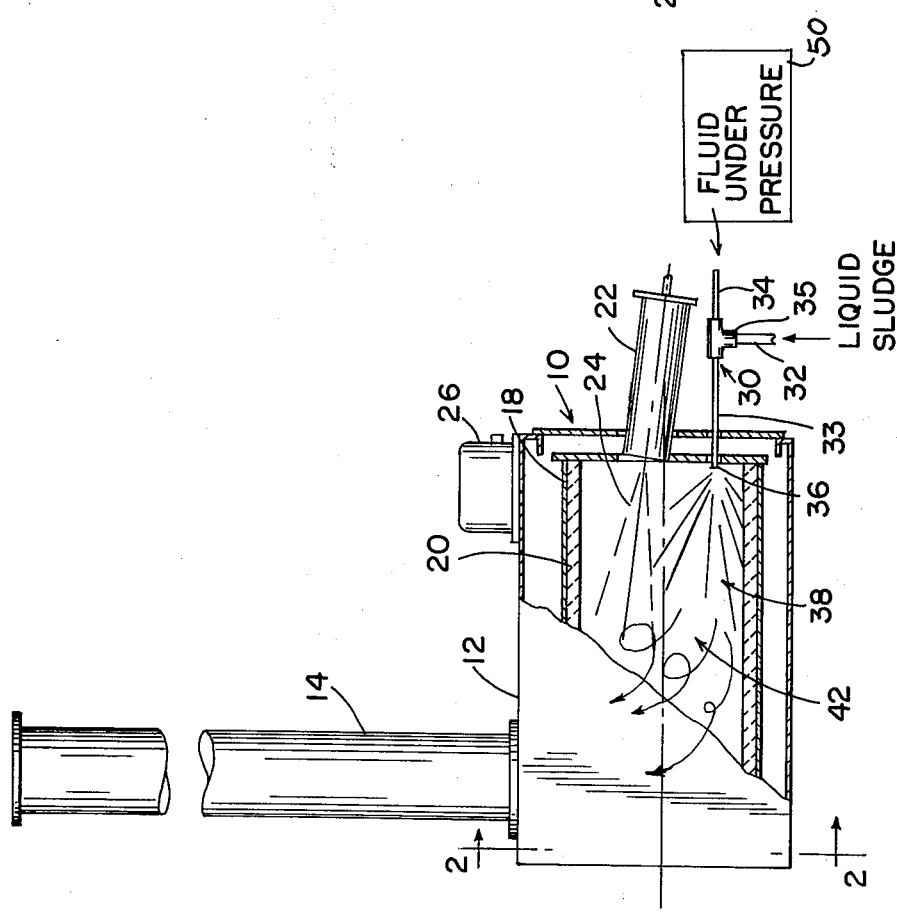

3,903,813

METHOD AND APPARATUS FOR INCINERATING SLUDGE

BACKGROUND OF THE INVENTION

This invention relates to the processing of waste matter to reduce its volume and facilitate its disposal without adverse environmental effects and, in particular, to the incineration of such waste in the form of liquid sludge.

Incineration of sludge is a common method of sludge disposal. All types of sludges, including completely combustible oil and waste oil sludges or partly combustible sewage sludges from sewage treatment, chemical toilet or other water reduction systems may be dried and burned. Incineration is today being used in many plants and industries where final disposal of solid waste is a problem. Incineration, depending upon the degree of its completeness, has the advantage of freedom from many odors, independence of weather, and a great reduction in the volume and weight of the end products which must be ultimately disposed. One of the problems in large scale applications of sludge incineration has been drying the moist sludge sufficiently so that it will ignite and burn. Commonly used apparatus for heat drying of sludge in large industrial and municipal applications having large volumes of solids are rotary kilns, flash dryers, multiple hearth furnaces and spray dryers. A spray dryer is a vertical tower down which a current of hot gases flows. Fine particals of wet sludge are sprayed into the tower, the water quickly evaporated from the small sludge particles to pass off with the gases. Usually, however, the moisture-laden exhaust gases must be secondarily incinerated to remove their undesirable odors. Such large scale incineration operations, moreover, are simply not economically feasible for use with small sewage treatment "package" plant systems or chemical or vacuum toilet systems which might be used in parks, construction sites, etc.

In such small applications, it has been attempted to pump the sludge or waste solids directly into an incinerator through a nozzle to form a spray of sludge particles on liquid droplets to make the sludge more susceptible to combustion in the presence of intense heat. A stream of sludge has also been directed against a wall of the incinerator to try to create such a spray. The primary disadvantage with these solutions, however, is that the spray nozzle, because of the small size orifices necessary to achieve the desired fineness of spray, becomes continuously clogged by sludge particles. Even when the sludge particles are ground to a small size, they still tend to clog the nozzle orifices. On the other hand, sludge directed against a wall of the incinerator fails to achieve a uniform spray and collects at the bottom of the incinerator.

In addition, in presently available commercial versions of such incinerators, when the burner flame contacts the cold surface of the liquid spray, the flame will often be quenched, stopping combustion and producing undesirable smoke. Most commercial incinerators also require a second burner to reduce not only this smoke but also to combust disagreeable gaseous by-products by the initial combustion process. Finally, in some presently available incinerators of this type, the liquid contact with the refractory walls of the combustion chamber prior to evaporation, causes thermal stresses to be created in these walls which reduce the useful life of the incinerator.

SUMMARY OF THE INVENTION

The present invention involves a method and apparatus for the incineration of solid waste in solution, i.e. liquid sludge, in which the liquid sludge is forced into a combustion chamber under pressure to produce a fine spray which enters at an angle diverging from that of a burner flame in the chamber. The burner flame is drawn into the low pressure zone created by the cold expanded liquid sludge spray to create a turbulent combustion reaction within the chamber which results in optimum oxidation of both the waste solids and undesirable gases.

The present invention overcomes the disadvantages of the prior art and achieves optimum combustion of liquid sludge by a conventional combustion chamber having an exhaust stack to discharge exhaust gases, and a heating means and liquid sludge injecting means mounted adjacent one another on an interior wall of the combustion chamber. The heating means is preferably an oil or gas burner which produces an outwardly extending burner flame capable of creating very high temperatures within the combustion chamber. The means for injecting liquid sludge includes a conventional conduit or liquid line through which the sludge may be pumped from the sludge reservoir toward the chamber. This conduit is narrowed toward its inward end or chamber end and terminates in a restrictive orifice or nozzle. This nozzle is mounted on the same vertical wall of the combustion chamber as the burner and preferably below the burner orifice. The sludge conduit is also in communication with a pressure line through which compressed air or other suitable pressurized fluids, such as steam, are introduced into the liquid sludge as it is being pumped toward the chamber. As the liquid sludge is forced through the restrictive orifice under pressure the velocity of the liquid sludge and the gas are increased significantly so that the liquid sludge is ejected in an atomized form. The small particles of solid waste are thus carried by small droplets of water in a spray or mist which radiates outwardly from the point of the nozzle.

This sudden expansion of the already cold liquid sludge in atomized form into the larger volume of the combustion chamber results in not only a large reaction surface for fast vapor evaporation and combustion of solids but also a significant decrease in the temperature and pressure of the liquid sludge. This decrease in temperature and pressure forms a cold, low pressure zone within the compression chamber which attracts the heat produced by the burner flame and draws this heat producing flame into it. The coincidence of the cold, low pressure spray and the hot burner flame creates a tremendous turbulence within the chamber which results in the droplets of the liquid carrying the solids being flash evaporated and the solid particles being flash dried and ignited to combustion. The swirling or turbulence also prolongs the period of combustion so that gases present in the secondary sludge or produced by the initial combustion of solids may be also heated to a temperature sufficient to cause them to be completely oxidized and thereby eliminated from the exhaust gases.

The nozzle of the injecting means through which the liquid sludge is sprayed into the chamber is preferably located at a point below and adjacent to the burner flame and set at a diverging angle to this flame to prevent accidental quenching of the flame by the sludge spray and thereby eliminate smoke. This position also allows the heat of the flame to be drawn into the low pressure spray zone most effectively, resulting in the desired swirling action and heating the upper walls of the incinerator so that they too may be used in the process of drying and igniting the sludge particles. The use of a pressurized fluid to force the liquid sludge into the chamber permits use of a larger diameter nozzle opening and also continuously cleans the nozzle and conduit.

Accordingly, it is an object of the present invention to provide an apparatus for incinerating sludge in a simple, extremely sufficient manner which is inexpensive to manufacture and operate.

It is a further object of the present invention to provide an apparatus for incinerating sludge having an extended period of combustion within the incinerator to assure complete and optimum combustion of waste matter and undesirable gases.

It is another object of the present invention to provide an apparatus for incinerating sludge which eliminates the smoke produced by accidental quenching of a burner flame used in the combustion process.

It is still another object of the present invention to provide an apparatus for incinerating sludge in which the sludge is forced by a pressurized fluid through a nozzle to form a spray within a combustion chamber and clean the nozzle.

It is one more object of the present invention to provide an apparatus for incinerating sludge in which a spray nozzle is located below and at a divergent angle to the burner flame to eliminate quenching of the flame and produce a controlled turbulence within the combustion chamber.

It is a still further object of the present invention to provide a method of incinerating sludge by injecting such waste under the influence of a pressurized fluid into a combustion chamber atomizing the sludge into a spray, and rapidly heating the spray to a temperature sufficient to oxidize an optimum possible amount of volatile waste matter and gases.

These and other objects of the present invention will become apparent in the following description, taken in conjunction with the drawings, wherein:

FIG. 1 is a side elevational schematic view of an incinerating apparatus according to the present invention, with a portion of the wall of the combustion chamber cut away to disclose its interior; and, FIG. 2 is a partial cross-sectional elevational view of the incinerating apparatus shown in FIG. 1 taken generally along line 2—2 in FIG. 1.

DESCRIPTION OF THE DRAWING

Referring now to the drawings, and in particular, to FIG. 1, the liquid sludge incinerator of this invention is shown, in general, at 10. The term "sludge" or "liquid sludge", as used in this application refers to a composition of solid organic or inorganic waste matter and water, having a consistency which varies with its water content. The present invention is particularly designed to be used in the reduction and disposal of sludge produced by small sewage treatment facilities, chemical toilets or other water reduction systems, such as vacuum toilets or recirculation systems, or similar systems producing combustible oil sludge or waste oil. Liquid sludges containing between 1 and 5 percent sludge solids are particularly susceptible to being pumped into and incinerated in the present invention with optimum results. It is to be understood, however, that scaling in size of the present invention, including increasing the size of the nozzle orifice, and/or increasing the pressure of the pressurized fluid as will be explained below, may permit use of a liquid sludge having a greater solids content than 5 percent.

The liquid sludge incinerator 10 includes a combustion chamber 12 which is generally rectangular in exterior configuration, having, at one end thereof, an exit port opening into an exhaust stack 14. This stack 14 is used to exhaust end product gases of the combustion reaction to the atmosphere. The exhaust stack 14 has a draft regulator 16 to regulate the amount of draw into the stack. The interior wall of combustion chamber 12 is formed of an inner cylindrical shell 18 having a lining 20 formed from commercially available refractory material. Such materials should be able to withstand temperatures of up to 2000°F. All materials used in the construction of the present incinerator are readily available and should be strong, easily formed, and, if exposed to the combustion reaction or exhaust gases, be resistant to high temperatures and chemical corrosion.

At one end of the cylindrical combustion chamber 12 is mounted a burner 22. This burner 22 may be any suitable commercial type, such as oil or gas, which will produce an outwardly extending flame 24 from its orifice, which may be controlled to produce or attain the temperature within the combustion chamber necessary to ignite and combust the combustible solids in the liquid sludge, and also any undesirable odor causing gases associated with the sludge or produced by the initial oxidation of these solids. The burner flame 24, normally produced by the ignition of the fuel forced through an orifice in the burner 22 is preferably controlled by an ignition transformer 26 mounted outside the combustion chamber 12.

The liquid sludge is transferred to the chamber 12 from a collecting or treatment point through a sludge conduit generally shown at 30. A sludge pump (not shown) is placed in this sludge conduit 30 which is capable of forcing the liquid sludge toward the combustion chamber against a desired pressure, as explained below. Sludge conduit 30 includes an ejector pipe 33 of narrower diameter than the main portion of conduit 30, having a restrictive orifice or nozzle 36 placed over its inward open end within chamber 12. Near the opposite end of the ejector pipe 33 is connected a pressurized fluid line 34 and the larger diameter portion 32 of the sludge conduit by a tee connection 35. Fluid line 34 is in communication with a source of pressurized fluid 50.

The fluid under pressure is preferably compressed air, but vapors such as steam, gases or other fluids may be used which will accomplish the desired results and will not impede sludge combustion or react with the liquid within the conduit. Compressed air as available in most industrial operations is satisfactory, and pressures of 30 to 40 PSI have been used successfully. One advantage of using compressed air is that it will increase the available oxygen in the chamber and serve to promote more complete combustion of the solid waste and gases within the chamber. The primary purpose, however, of introducing the pressurized fluid into the liquid sludge conduit prior to the chamber, it to positively force the sludge through the restrictive orifice 36 while automatically cleaning the orifice of particulate matter to prevent its clogging. Under the influence of the pressurized fluid, the restrictive orifice 36 substantially increases the velocity of both the sludge and fluid flowing through it to produce a liquid spray 38 in the form of an atomized mist which disperses over the interior of the chamber 12. This spray, in which solid particles are carried on dispersed liquid droplets provides a large reaction surface which allows fast evaporation of the vapor and combustion of the solids and gases by the heat from the burner flame.

In the operation of this incinerator, according to the method of the present invention, the waste in solution is conducted to the combustion chamber and forced, under pressure, through the restrictive orifice 36 which increases its velocity to form liquid spray 38. Since this spray enters a combustion chamber which is at a very high temperature, the cold liquid spray, which has expanded tremendously in volume upon passing through the orifice 36, creates a zone of low pressure and temperature within the combustion chamber. If the burner flame 24 is directed into the liquid spray, as would be the case in prior incinerator structures, the flame could be quenched when it contacts the cold surface of the spray and combustion would be stopped and rendered incomplete. Premature quenching produced an undesirable amount of smoke which was pulled into the stack. It was discovered, however, that if the burner 22 and the orifice 36 are positioned adjacent one another on a wall of the combustion chamber with the orifice under the burner and directed at divergent angles to one another, as shown in FIG. 2, quenching of the flame is eliminated along with the resulting smoke.

It was also discovered that positioning the restrictive orifice on the same wall of the chamber as the burner so that the point of entry of the liquid sludge was adjacent the source of the burner flame will cause the liquid spray low pressure zone to be positioned in the combustion chamber so that it will literally draw or suck the hot flame and gases into it, thereby creating a turbulence or swirling action within the incinerator. This induced turbulence increases the length of the combustion reactions and, therefore, not only allows evaporation of the carrying liquid, and drying, ignition, and combustion of the solids, but also allows the objectionable gases present in the liquid sludge and the gaseous byproducts produced by initial combustion of the solids to also be completely combusted, i.e. oxidized, to eliminate odors in the exhaust gas. It has been found that more effective turbulence and combustion is created by positioning the spray under the burner. The longer period of combustion also allows a partial or complete evaporation of the carrying liquid before it contacts the walls of the combustion chamber, thereby reducing thermal stresses in these chamber walls.

The swirling action created in the incinerator by the interfacing of the liquid spray and the hot burner flame 24 can be analogized to the meteorological coincidence of high and low pressure weather fronts which creates an atmospheric turbulence. The swirling action of the present invention, therefore, eliminates the second burner normally required in present incinerators to reduce undesirable gas byproducts of the initial combustion. Positioning of the burner near the center of chamber, as shown in FIG. 1, also reduces the chance of flame inpingement on the walls, and results in longer incinerator life.

Upon consideration of the foregoing, it will become obvious to those skilled in the art that various modifications may be made without departing from the invention embodied herein. Therefore, only such limitations should be imposed as are indicated by the spirit and scope of the following claims.

I claim.

1. An incineration apparatus particularly adapted to achieve optimum combustion of sludge wastes and associated undesirable gases, including a chamber in which a combustion reaction of said sludge wastes and gases may occur, said chamber having an exit port to evacute hot gases produced by said combustion reaction from said chamber, means for injecting the sludge wastes into said chamber under pressure to produce a sludge spray including restrictive orifice means mounted near a terminal end of a conduit means for conducting said sludge wastes into said chamber, said orifice means opening into said chamber, said conduit means in communication with a source of fluid under pressure, said fluid under pressure being mixed with said sludge wastes prior to the passage of said sludge wastes through said restrictive orifice means, the pressurized injection of said sludge wastes into said chamber acting to atomize said sludge wastes for dispersal as said spray into said combustion chamber, while preventing clogging of said means for injecting said sludge wastes by particulate matter, and means selectively disposed in said chamber for rapidly heating said sludge spray sufficiently to obtain combustion of both the sludge wastes and any undesirable gases in said chamber, said means for heating including a burner producing an outwardly extending flame, said burner being mounted on a wall of said chamber in spaced relationship to and at a divergent angle relative to said restrictive orifice means to prevent quenching of said burner flame by the sludge spray and thereby eliminate smoke during the operation of the incinerator.

2. The incineration apparatus set forth in claim 1 wherein said means for injecting said sludge waste into said combustion chamber is located below said burner on a generally vertical wall of said chamber such that the injection, under pressure, of said sludge waste into said combustion chamber forms said sludge spray having a low pressure and temperature, and forming a low pressure zone in said chamber which draws heat from said burner into it, thereby producing a turbulence within said chamber during combustion of said sludge which assures a longer period of combustion and more complete oxidation of solids and gases to eliminate undesirable gases and more fully reduce solids.

3. In an incineration apparatus particularly adapted to achieve optimum combustion of liquid sludges and having a combustion chamber in which combustion of a liquid sludge and associated gases may occur, said chamber having an exit port to evacuate gases produced by said combustion reaction from said chamber, means for injecting said liquid sludge into said chamber and burner means for heating said liquid sludge to a temperature sufficient to cause combustion of volatile solids contained in said liquid sludge and volatile gases, the improvement comprising fluid pressure means in communication with said means for injecting said liquid sludge into said combustion chamber and nozzle means mounted near an end of said means for injecting said liquid sludge into said combustion chamber to restrict the flow and increase the velocity of said liquid sludge flowing therethrough, said nozzle means disposed in spaced relationship to said burner means on a generally vertical wall of said combustion chamber below said burner means such that a flame produced by said burner means will be drawn into a low pressure zone created by the injected liquid sludge and thereby create a turbulence within the combustion chamber which assures more complete combustion of the sludge and associated gases, said fluid pressure means introducing a pressurized fluid into said liquid sludge, prior to its injection into said combustion chamber, to force said liquid sludge through said nozzle means such that said means for injecting said liquid sludge, including said nozzle means is automatically maintained clear of all obstructions, said means to inject said liquid sludge, including said nozzle means, being directed into said chamber at a diverging angle relative to said burner means to prevent accidental quenching of said burner means and to eliminate the smoke resulting therefrom.

4. In an incineration apparatus particularly adapted to achieve optimum combustion of wastes in the form of liquid sludge, including a chamber in which combustion of said liquid sludge may occur, said chamber having an exit port to evacuate gases produced by the combustion reaction therefrom, means for injecting said liquid sludge into said chamber under pressure and burner means selectively disposed in said chamber for rapidly heating said injected liquid sludge to obtain combustion of said sludge and various undesirable gases, the improvement comprising locating an outlet portion of said means for injecting said liquid sludge into said chamber under pressure in spaced relationship to said burner means and at a divergent angle relative thereto such that the injection of said liquid sludge into said chamber results in a sudden decrease in pressure and temperature of said liquid sludge within said chamber, thereby forming a low pressure zone in said chamber which draws a flame of said burner means toward it without quenching said flame, and creating a turbulence within said chamber which assures a longer period of combustion and thereby more complete oxidation of said sludge and any undesirable gases present within the chamber.

5. The improvement set forth in claim 4 wherein said means for injecting said liquid sludge into said chamber includes nozzle means at its inward end, disposed below said burner means on a wall of said chamber to inject said liquid sludge as an atomized spray into said combustion chamber.

6. The improvement set forth in claim 5 wherein said nozzle means is mounted over an inward end of fluid conduit means for conducting said liquid sludge toward said chamber for combustion, said conduit means being in communication with a source of liquid sludge and a source of fluid under pressure which is introduced into said liquid sludge within said conduit means to positively force said liquid sludge through said nozzle means whereby said liquid sludge is atomized and dispersed as a spray within said chamber while waste particles are automatically cleaned from said nozzle means and said conduit means.

7. A method of incinerating sludge and associated undesirable gases in a combustion chamber to achieve optimum oxidation of said sludge and gases while eliminating smoke in the incineration process, including the steps of:

introducing a fluid under pressure into conduit means carrying said sludge toward said chamber to assist in moving said sludge through said conduit means toward said chamber while eliminating accumulation of said sludge within said conduit means;

injecting said sludge, under the influence of such pressurized fluid, into said chamber through means which increases the velocity of said sludge and forms a spray of said sludge within said chamber, said means for injecting said sludge including a restrictive orifice disposed at a terminal portion of said fluid conduit for transfering said sludge into said chamber; and, simultaneously exposing said sludge spray to a burner effective to heat said sludge spray within said chamber to a temperature sufficient to cause combustion of volatile solids and gases and evaporation of water, said burner being disposed at a divergent angle relative to the angle at which said sludge is sprayed into said chamber to prevent quenching of said burner by said sludge spray and to eliminate smoke, said restrictive orifice means being disposed below the plane of said burner such that a flame produced by said burner will be drawn toward a zone of low pressure and temperature formed by said sludge sprayed into said chamber to obtain opimum combustion of said sludge and associated volatile gases.

* * * * *